US010778647B2

(12) United States Patent
Kumaran

(10) Patent No.: US 10,778,647 B2
(45) Date of Patent: Sep. 15, 2020

(54) DATA ANONYMIZATION FOR DISTRIBUTED HIERARCHICAL NETWORKS

(71) Applicant: Cisco Technology, Inc., San Jose, CA (US)

(72) Inventor: Vikram Kumaran, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 794 days.

(21) Appl. No.: 15/185,380

(22) Filed: Jun. 17, 2016

(65) Prior Publication Data

US 2017/0366513 A1    Dec. 21, 2017

(51) Int. Cl.
*H04L 29/06* (2006.01)
*H04L 29/08* (2006.01)
*H04W 12/02* (2009.01)
*H04W 4/70* (2018.01)
*H04W 4/38* (2018.01)

(52) U.S. Cl.
CPC .......... *H04L 63/0421* (2013.01); *H04L 67/12* (2013.01); *H04L 67/2828* (2013.01); *H04L 67/2885* (2013.01); *H04W 12/02* (2013.01); *H04W 4/38* (2018.02); *H04W 4/70* (2018.02)

(58) Field of Classification Search
CPC . H04L 63/0421; H04L 67/12; H04L 67/2828; H04L 67/2885; H04W 12/02; H04W 4/38; H04W 4/70
See application file for complete search history.

(56) References Cited

U.S. PATENT DOCUMENTS

| 2014/0122702 A1* | 5/2014 | Jung ................... H04L 43/0876 |
| | | 709/224 |
| 2016/0344702 A1* | 11/2016 | Ukena ................. H04L 63/0421 |
| 2016/0350557 A1* | 12/2016 | Mikami ............ G06F 17/30339 |

OTHER PUBLICATIONS

Cao, et al., "CASTLE: Continuously Anonymizing Data Streams", IEEE Transactions on Dependable and Secure Computing, vol. 8, No. 3, May/Jun. 2011, pp. 337-352.

(Continued)

*Primary Examiner* — Alexander Lagor
*Assistant Examiner* — Forrest L Carey
(74) *Attorney, Agent, or Firm* — Behmke Innovation Group LLC; James M. Behmke; Jonathon P. Western

(57) ABSTRACT

Various implementations disclosed herein provide a method for anonymizing data in a distributed hierarchical network. In various implementations, the method includes determining a first set of attribute hierarchy counts that indicate a number of occurrences of corresponding attributes that are stored at the first network node and have not been transmitted upstream towards the hub. In various implementations, the method includes receiving, from a second network node, a second set of attribute hierarchy counts that indicate a number of occurrences of corresponding attributes at the second network node. In various implementations, the method includes determining whether a sum based on the first and second set of attribute hierarchy counts satisfies an anonymization criterion. In some implementations, the sum indicates a total number of occurrences for a corresponding attribute that are stored at the first and second network nodes and have not been transmitted upstream towards the hub.

20 Claims, 6 Drawing Sheets

(56) References Cited

OTHER PUBLICATIONS

Li, et al., "t-Closeness: Privacy Beyond k-Anonymity and I-Diversity", 2007 IEEE 23rd Int'l Conf. on Data Eng., Istanbul, 2007, pp. 106-115.

Sakpere, et al., "A State-of-the-Art Review of Data Stream Anonymization Schemes", Information Security in Diverse Computing Environments, Chapter 3, pp. 24-25.

* cited by examiner

US 10,778,647 B2

DATA ANONYMIZATION FOR DISTRIBUTED HIERARCHICAL NETWORKS

TECHNICAL FIELD

The present disclosure generally relates to data anonymization, and in particular, to data anonymization for distributed hierarchical networks.

BACKGROUND

The Internet of Things (IoT) usually refers to a network of physical objects. The physical objects often include devices, vehicles, buildings and other items. The physical objects are usually embedded with electronics, software, sensors, and network connectivity that enable these objects to collect and exchange data. The IoT network is typically distributed and has a hierarchical architecture. In such distributed hierarchical networks, data is typically generated at the edges of the network. In some previously available networks, the data that is generated at an end point of the network is shared with other components of the network. Sharing the data is often problematic because the data is usually private. Moreover, the data is typically generated in real time as a stream. Therefore, the objective of sharing data tends to conflict with the need for privacy.

Some previously available networks anonymize static tables in databases. Moreover, some previously available networks anonymize single data streams. However, the techniques employed by previously available networks are usually not well-suited for high fan-in distributed hierarchical data sources that are typically found in IoT networks. For example, in order to anonymize the data, some previously available networks employ techniques that add extra delays in data emission. As a consequence of employing techniques that introduce extra delays, the data that is shared is often stale and not current. Moreover, in an effort to anonymize the data, some previously available networks employ techniques that lead to significant information loss. As a consequence of employing techniques that lead to significant information loss, the utility of the anonymized data decreases. In other words, when a network component receives the anonymized data the network component is unable to use the data effectively due to the significant information loss.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
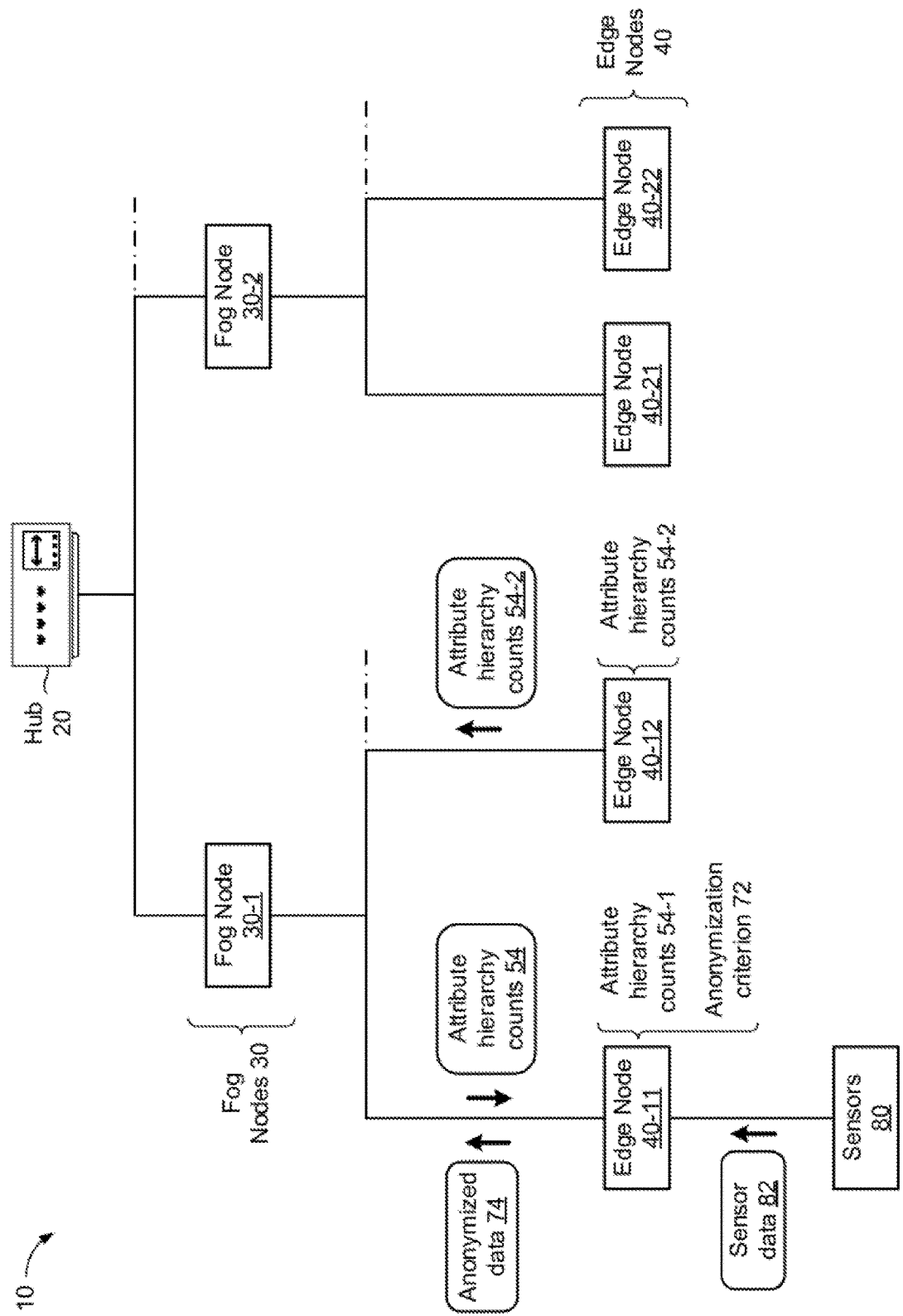
FIG. 1 is a schematic diagram of a distributed hierarchical network in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Various implementations disclosed herein enable anonymizing data and transmitting the anonymized data upstream towards a hub of a distributed hierarchical network. For example, in various implementations, a method of anonymizing data is performed by a first network node within a group of network nodes (e.g., by a first edge node within a group of edge nodes). In various implementations, the first network node includes one or more processors, a non-transitory memory and one or more network interfaces. In various implementations, the method includes determining a first set of attribute hierarchy counts that indicate a number of occurrences of corresponding attributes that are stored at the first network node and have not been transmitted upstream towards the hub. In various implementations, the method includes receiving, from a second network node, a second set of attribute hierarchy counts that indicate a number of occurrences of corresponding attributes that are stored at the second network node and have not been transmitted upstream towards the hub. In various implementations, the method includes determining whether a sum based on the first set of attribute hierarchy counts and the second set of attribute hierarchy counts satisfies an anonymization criterion. In some implementations, the sum indicates a number of collective occurrences for a corresponding attribute that is stored at the first network node and the second network node, and that has not been transmitted upstream towards the hub.

Example Embodiments

FIG. 1 is a block diagram of a distributed hierarchical network 10 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the distributed hierarchical network 10 includes a hub 20, fog nodes 30 (e.g., a first fog node 30-1, a second fog node 30-2, . . . ), edge nodes 40 (e.g., a first edge node 40-11, a second edge node 40-12, a third edge node 40-21, a fourth edge node 40-22, . . . ), and sensors 80. In various implementations, the hub 20, the fog nodes 30, the edge nodes 40 and the sensors 80 are connected via one or more communication channels (e.g., a portion of the Internet, a cellular network, etc.).

In operation, the edge nodes 40 receive sensor data 82 from the sensors 80. In various implementations, the edge nodes 40 anonymize the sensor data 82, and send the anonymized data 74 upstream towards the hub 20. In some implementations, an edge node 40 sends the anonymized data 74 to a fog node 30 that is serving as a parent node for the edge node 40. For example, the first edge node 40-11 sends the anonymized data 74 to the fog node 30-1. In some implementations, the fog node 30 forwards the anonymized data 74 to the hub 20. Alternatively, in some implementations, the fog node 30 further anonymizes the anonymized data 74 before sending the anonymized data 74 to the hub 20.

In various implementations, the edge nodes 40 anonymize the sensor data 82 by generalizing the sensor data 82. In some implementations, an edge node 40 generalizes the sensor data 82 by identifying private information in the sensor data 82, and concealing the private information. For example, in some implementations, the edge node 40 categorizes the sensor data 82 into three types of attributes: identifying attributes, quasi-identifying attributes, and sensitive attributes. In some implementations, identifying attributes include attributes that definitively identify a person or an object (e.g., a Social Security Number). In some implementations, quasi-identifying attributes include attributes that identify a person or an object with a great degree of certainty (e.g., a physical address). In some implementations, sensitive attributes include attributes that indicate sensitive information (e.g., failure codes, salary, GPS location, etc.).

In some implementations, the edge node 40 conceals the identifying attributes. For example, in some implementations, the edge node 40 replaces the identifying attributes with a character such as an asterisk (e.g., "*"). In some implementations, the edge node 40 generalizes the quasi-identifying attributes and/or the sensitive attributes. In some scenarios, the edge node 40 groups a set of quasi-identifying attributes or sensitive attributes that are within a degree of similarity, and conceals a portion of each attribute in the group. In some implementations, concealing portions of attributes or generalizing the attributes is referred to as increasing a degree of anonymization. In some implementations, concealing portions of attributes is referred to as changing a level of granularity.

Tables 1, 2 and 3 illustrate an example in which the attributes are anonymized (e.g., generalized) to different degrees of anonymization in order to remove private information. In this example, the attributes are addresses in combination with the type of cuisine that is ordered from the addresses every week. Each table illustrates a different degree of anonymization. For example, in Table 1 the degree of anonymization is 0 because the entire address is visible. In Table 2, the degree of anonymization is increased to 1 by concealing the apartment numbers. In Table 3, the degree of anonymization is further increased to 2 by concealing the floor numbers.

TABLE 1

Degree of anonymization is 0 because the entire address is visible

| Attri- bute # | Attribute type: Apt. No., Floor, Building No, Cuisine type) | Attribute Count (e.g., orders/week) |
|---|---|---|
| 1 | Apt. No. 3, $2^{nd}$ Floor, Building J, Chinese | 1 |
| 2 | Apt. No. 7, $2^{nd}$ Floor, Building J, Italian | 1 |
| 3 | Apt. No. 5, $2^{nd}$ Floor, Building J, Chinese | 1 |
| 4 | Apt. No. 3, $4^{th}$ Floor, Building J, Italian | 1 |
| 5 | Apt. No. 3, $4^{th}$ Floor, Building J, Indian | 1 |
| 6 | Apt. No. 3, $2^{nd}$ Floor, Building G, Italian | 1 |
| 7 | Apt. No. 6, $2^{nd}$ Floor, Building G, Indian | 1 |
| 8 | Apt. No. 1, $4^{th}$ Floor, Building G, Italian | 1 |

TABLE 2

Degree of anonymization is increased to 1 by removing the apartment numbers

| Attri- bute # | Attribute type: Floor, Building No, Cuisine Type | Attribute Count (e.g., orders/week |
|---|---|---|
| 1 | $2^{nd}$ Floor, Building J, Chinese | 2 |
| 2 | $2^{nd}$ Floor, Building J, Italian | 1 |
| 3 | $4^{th}$ Floor, Building J, Italian | 1 |
| 4 | $4^{th}$ Floor, Building J, Indian | 1 |
| 5 | $2^{nd}$ Floor, Building G, Italian | 1 |
| 6 | $2^{nd}$ Floor Building G, Indian | 1 |
| 7 | $4^{th}$ Floor, Building G, Italian | 1 |

TABLE 3

Degree of anonymization is increased to 2 by removing the floor numbers

| Attri- bute # | Attribute type: Building No, Cuisine Type | Attribute Count (e.g., orders/week) |
|---|---|---|
| 1 | Building J, Chinese | 2 |
| 2 | Building J, Italian | 2 |
| 3 | Building J, Indian | 1 |
| 4 | Building G, Italian | 2 |
| 5 | Building G, Indian | 1 |

As can be seen in the example of Tables 1, 2 and 3, when the degree of anonymization is increased, the attributes become more general (e.g., shorter) and the attribute counts tend to increase. As illustrated in FIG. 1, in some implementations, an edge node 40 stores a set of attribute hierarchy counts 54. For example, the first edge node 40-11 stores a first set of attribute hierarchy counts 54-1, and the second edge node 40-12 stores a second set of attribute hierarchy counts 54-2. Each attribute hierarchy count represents a number of occurrences for a corresponding attribute at a particular hierarchy in the distributed hierarchical network 10. In other words, an attribute hierarchy count represents a number of instances of an attribute at a given hierarchy within the distributed hierarchical network 10. For example, in some implementations, the information shown in Table 3 is stored at the first edge node 40-11. In this example, the combination of building numbers and cuisine types are attributes, and the number of orders per week represent the first set of attribute hierarchy counts 54-1. A person of ordinary skill in the art will appreciate that sending the information in Table 2, as the anonymized data 74, is better than sending the information in Table 1 because Table 1 reveals too much private information (e.g., the exact apartment numbers). Moreover, a person of ordinary skill in the art will appreciate that sending the information in Table 3, as the anonymized data 74, is even better than sending the information in Table 2 because Table 3 reveals even less private information than Table 2 (e.g., no apartment numbers and no floor numbers).

Tables 3 and 4 illustrate another example in which the attributes are anonymized in order to remove private information. In Table 3, the attributes are names of people in combination with their ages. In Table 4, the attributes are age groups and the attribute counts are the number of people in the same age group. In Table 3, the degree of anonymization is 0 because the names and ages are visible. In Table 4, the degree of anonymization is 1 because the names have been removed and the ages have been replaced with age groups.

TABLE 4

Degree of anonymization is 0

| Attribute # | Attribute type: Name, Age | Attribute Counts |
|---|---|---|
| 1 | Ronke, 20 | 1 |
| 2 | Ayokunle Ola, 27 | 1 |
| 3 | Wilson, 31 | 1 |
| 4 | Lydia Otoks, 48 | 1 |
| 5 | Walex Olu, 50 | 1 |
| 6 | Jossy Temmy, 21 | 1 |
| 7 | Sammy Okposi, 35 | 1 |
| 8 | Anne Chuks, 58 | 1 |
| 9 | Edwin James, 42 | 1 |

TABLE 5

Degree of anonymization is increased to 1 by removing the names and replacing ages with age groups

| Attribute # | Attribute type: Age group | Attribute Count |
|---|---|---|
| 1 | 20-30 | 3 |
| 2 | 30-40 | 2 |
| 3 | 40-50 | 2 |
| 4 | 50-60 | 2 |

In some examples, the information shown in Table 5 is stored at an edge node 40 (e.g., the first edge node 40-11). In such examples, the age groups are the attributes and the number of people in each age group represent the attribute hierarchy counts. A person of ordinary skill in the art will appreciate that sending the information in Table 5, as the anonymized data 74, is better than sending the information in Table 4 because Table 5 does not reveal any private information (e.g., names and exact ages).

In various implementations, the edges nodes 40 share their attribute hierarchy counts 54 with each other. In some implementations, the edge nodes 40 share their attribute hierarchy counts 54 with other edge nodes 40 that have the same fog node 30 as their parent. In other words, in some implementations, the edge nodes 40 share their attribute hierarchy counts 54 with their sibling edge nodes 40. In some implementations, an edge node 40 shares its attribute hierarchy counts 54 by sending a broadcast message to all its peers (e.g., to all other edge nodes 40 that are in the same trust network). As exemplified in FIG. 1, the second edge node 40-12 sends the second set of attribute hierarchy counts 54-2 to the first edge node 40-11. In some implementations, the second edge node 40-12 sends the second set of attribute hierarchy counts 54-2 directly to the first edge node 40-11. In some implementations, the second edge node 40-12 broadcasts the second set of attribute hierarchy counts 54-2, and the first edge node 40-11 receives the second set of attribute hierarchy counts 54-2 via the broadcast. In some implementations, the first edge node 40-11 receives all sets of attribute hierarchy counts 54 that are broadcasted by all edge nodes 40 that are in the same trust network (e.g., by all child nodes of the first fog node 30-1). Alternatively, in some implementations, the second edge node 40-12 sends the second set of attribute hierarchy counts 54-2 to the first edge node 40-11 via the first fog node 30-1. As exemplified in FIG. 1, in some implementations, the first edge node 40-11 receives the attribute hierarchy counts 54 from various (e.g., all) edges nodes 40 that are child nodes of the first fog node 30-1.

In various implementations, the first edge node 40-11 generates and transmits the anonymized data 74 upon determining that an anonymization criterion 72 is satisfied. In some implementations, the anonymization criterion 72 is a threshold. In such implementations, the first edge node 40-11 determines whether a sum based on the first set of attribute hierarchy counts 54-1 and the second set of attribute hierarchy counts 54-2 satisfies the anonymization criterion 72 (e.g., exceeds the threshold). In some implementations, the first edge node 40-11 determines the sum by adding a first attribute hierarchy count from the first set of attribute hierarchy counts 54-1 and a second attribute hierarchy count from the second set of attribute hierarchy counts 54-2. For example, if the attribute is a particular age group, then the first edge node 40-11 determines the sum by adding a first attribute hierarchy count for that particular age group from the first set of attribute hierarchy counts 54-1 and a second attribute hierarchy count for the particular age group from the second set of attribute hierarchy counts 54-2. In this example, if the sum is greater than the anonymization criterion 72 (e.g., a threshold), then the first edge node 40-11 sends information that identifies that particular age group and the sum as the anonymized data 74. A person of ordinary skill in the art will appreciate that by comparing the anonymization criterion 72 with the sum of at least two attribute hierarchy counts, instead of a single attribute hierarchy count, the anonymization criterion 72 will be satisfied more often. Hence, in some implementations, the anonymized data 74 is transmitted more often and data emission delays are avoided.

In some implementations, the operations described herein with respect to the first edge node 40-11 are performed by various (e.g., all) edge nodes 40 in the distributed hierarchical network 10. Moreover, in some implementations, the operations described herein with respect to the first edge node 40-11 are performed by network nodes at other hierarchies of the distributed hierarchical network 10. For example, in some implementations, the operations described herein with respect to the first edge node 40-11 are performed by the fog nodes 30. Put another way, in various implementations, the operations described herein with respect to the first edge node 40-11 are performed by network nodes at various hierarchies (e.g., all hierarchies) of the distributed hierarchical network 10.

Figure 2:
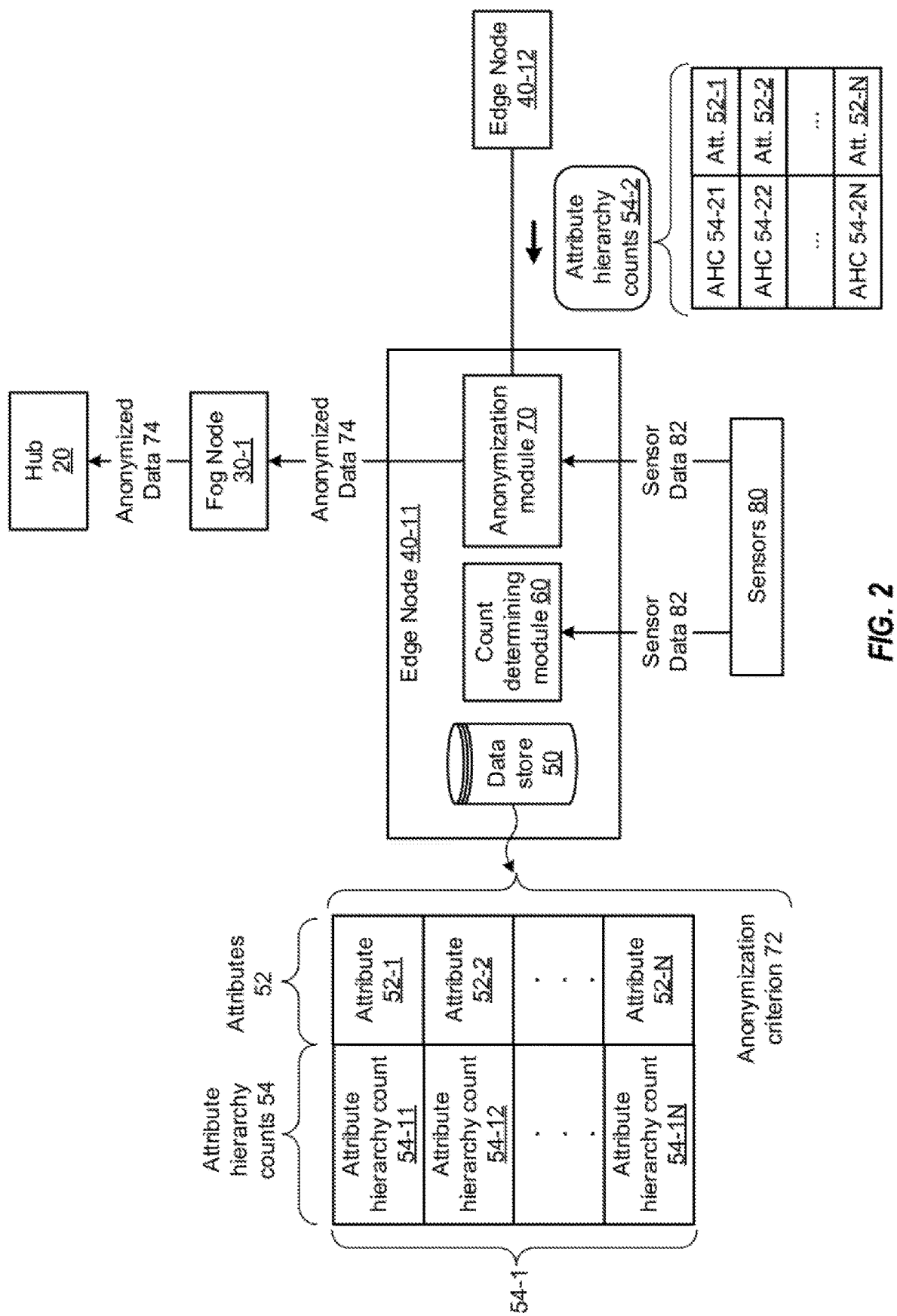
FIG. 2 is a block diagram of an edge node in accordance with some implementations.

FIG. 2 is a block diagram of an edge node 40 (e.g., the first edge node 40-11 shown in FIG. 1) in accordance with some implementations. While FIG. 2 illustrates various components of the first edge node 40-11, in various implementations, other edge nodes 40 include the same or similar components in order to perform the operations described with respect to the first edge node 40-11. Moreover, in various implementations, network nodes at other hierarchies (e.g., the fog nodes 30 shown in FIG. 1) include the same or similar components in order to perform the operations described herein with relation to the first edge node 40-11. Put another way, in various implementations, the operations described with respect to the first edge node 40-11 are performed by all network nodes at all hierarchies of the distributed hierarchical network 10 shown in FIG. 1. In various implementations, the first edge node 40-11 includes a data store 50, a count determining module 60, and an anonymization module 70. In various implementations, the first edge node 40-11 includes one or more data storage devices that store the data store 50, and computer readable instructions corresponding with the count determining module 60 and the anonymization module 70. In various implementations, the first edge node 40-11 includes one or more computing devices that execute the computer readable instructions corresponding with the count determining module 60 and the anonymization module 70.

In various implementations, the data store 50 stores attributes 52 and their corresponding attribute hierarchy counts 54. An attribute hierarchy count 54 indicates a number of occurrences of a corresponding attribute 52 that are stored in the data store 50 and have not been transmitted upstream as anonymized data 74. For example, the data store 50 stores a first attribute 52-1 and a first attribute hierarchy count 54-11 that represents a number of occurrences of the first attribute 52-1 that are stored in the data store 50 and have not been transmitted upstream towards the hub 20. Similarly, the data store 50 stores a second attribute 52-2 and its corresponding attribute hierarchy count 54-12. Furthermore, the data store 50 stores an Nth attribute 52-N and its corresponding attribute hierarchy count 54-1N. In some implementations, the attribute hierarchy counts 54-11, 54-12, ..., 54-1N are collectively referred to as the first set of attribute hierarchy counts 54-1.

In various implementations, the count determining module 60 determines the attribute hierarchy counts 54. In some implementations, the count determining module 60 accesses the data store 50 to count the number of occurrences of each attribute 52 that is stored in the data store 50 and that has not been transmitted upstream towards the hub 20. In some implementations, the count determining module 60 updates the attribute hierarchy counts 54 based on the sensor data 80 received from the sensors 80. For example, in some implementations, the count determining module 60 parses the sensor data 82 to identify attributes 52 within the sensor data 82, and updates the attribute hierarchy counts 54 to account for new occurrences of the attributes 52.

In various implementations, the anonymization module 70 generates the anonymized data 74, and sends the anonymized data 74 upstream towards the hub 20. For example, in some implementations, the anonymization module 70 sends the anonymized data 74 to a fog node 30 (e.g., the first fog node 30-1) that is serving as a parent node for the first edge node 40-11. In some implementations, the anonymization module 70 receives the sensor data 82, and parses the sensor data 82 to generate the attributes 52. In some implementations, the anonymization module 70 applies a degree of anonymization to the sensor data 82 in order to generate the attributes 52 (e.g., as illustrated in Tables 1-5). In some implementations, the anonymization module 70 generates attributes 52 by increasing the degree of anonymization of existing attributes 52 (e.g., as exemplified in Tables 1-5).

In various implementations, the anonymization module 70 utilizes a variety of anonymization techniques to anonymize the sensor data 80. For example, as discussed in relation to FIG. 1, in some implementations, the anonymization module 70 conceals private information by replacing the private information with a character (e.g., an asterisk). In some implementations, the anonymization module 70 removes the private information altogether. For example, in some implementations, the anonymization module 70 categorizes the attributes 52 into three categories: identifying attributes, quasi-identifying attributes and sensitive attributes. In some implementations, the anonymization module 70 conceals the identifying attributes. In some implementations, the anonymization module 70 generalizes the quasi-identifying attributes and the sensitive attributes. For example, as exemplified in Tables 1-5, in some implementations, the anonymization module 70 groups attributes 52 that are within a degree of similarity, and conceals dissimilar portions of the attributes 52 in the group. A person of ordinary skill in the art will appreciate that, in some implementations, the anonymization module 70 utilizes additional or alternative techniques for generating the anonymized data 74.

In various implementations, the anonymization module 70 receives a second set of attribute hierarchy counts 54-2 from another edge node 40 (e.g., the second edge node 40-12). The second set of attribute hierarchy counts 54-2 includes attribute hierarchy counts 54-21, 54-22, ..., 54-2N that correspond with the attributes 54-1, 54-2, ..., 54-N. In some implementations, the anonymization module 70 receives sets of attribute hierarchy counts from all edges nodes 40 that are siblings of the first edge node 40-11. In some implementations, the anonymization module 70 receives sets of attribute hierarchy counts from all edge nodes 40 that are in the same trust network as the first edge node 40-11.

In various implementations, the anonymization module 70 generates and sends the anonymized data 74 upon determining that the anonymization criterion 72 is satisfied. In some implementations, the anonymization module 70 determines whether the anonymization criterion 72 is satisfied by computing a sum of a first attribute count 54-11 from the first set of attribute hierarchy counts 54-1 and a second attribute count 54-21 from the second set of attribute hierarchy counts 54-2. The sum represents a total number of occurrences of the first attribute 52-1, at the first edge node 40-11 and the second edge node 40-12, which have not been transmitted upstream towards the hub 20. If the sum is greater than a threshold indicated by the anonymization criterion 72, then the first edge node 40-11 generates and transmit the anonymized data 74. In some implementations, the anonymized data 74 includes the attributes 52 that satisfy the anonymization criterion 72. In some implementations, the anonymized data 74 also includes the sum associated with each attribute 52 that satisfies the anonymization criterion 72. In such implementations, the sum corresponding with a particular attribute 52 represents a total number of occurrences of that particular attribute 52 at all edge nodes 40 within a trust network (e.g., all edge nodes 40 that are children of the first fog node 30-1).

Figure 3:
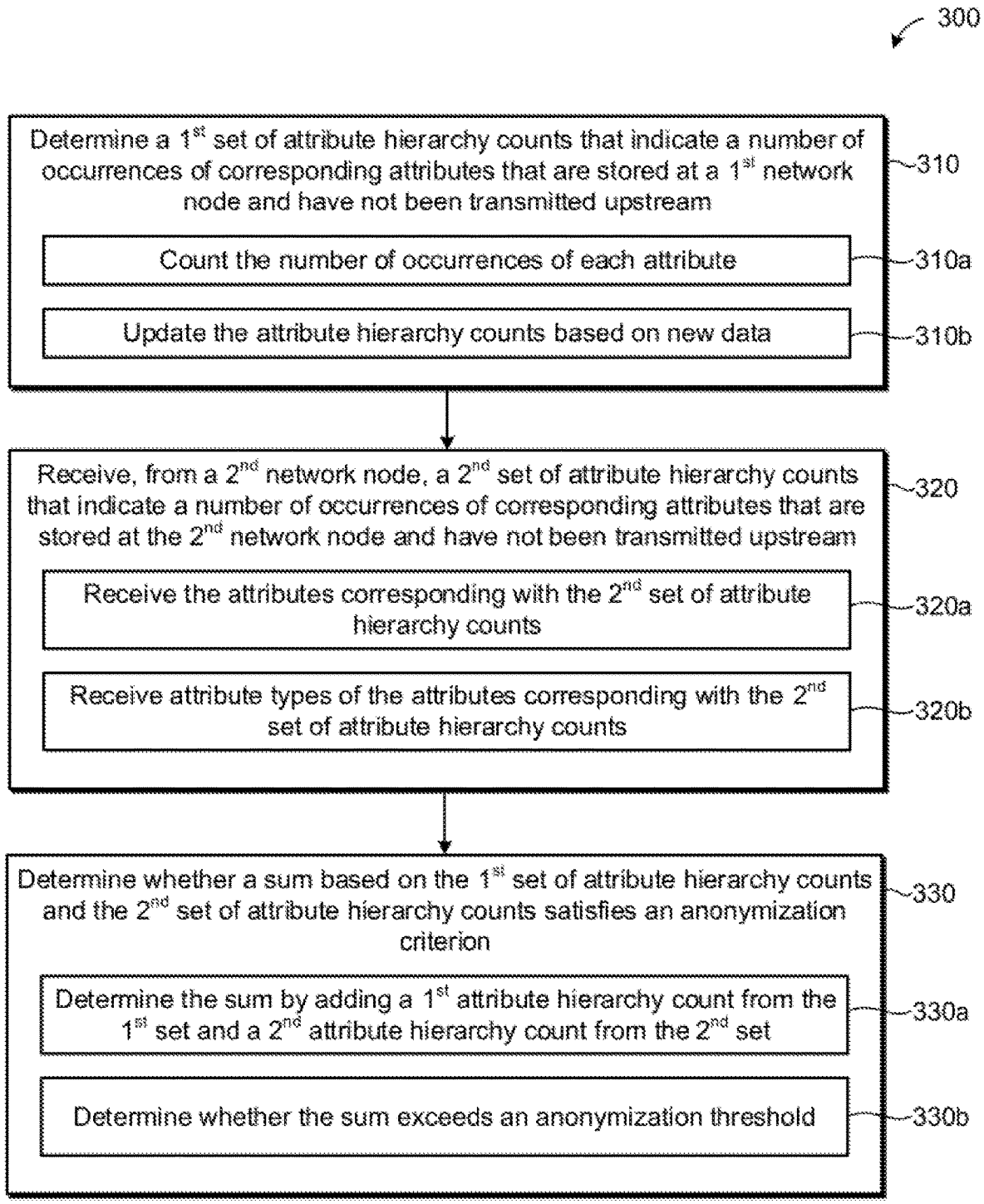
FIG. 3 is a flowchart representation of a method of anonymizing data at an edge node of a distributed hierarchical network in accordance with some implementations.

FIG. 3 is a flowchart representation of a method 300 of anonymizing data at a network node (e.g., the edge nodes 40 and/or the fog nodes 30 shown in FIG. 1) of a distributed hierarchical network according to some implementations. In various implementations, the method 300 is performed by a count determining module (e.g., the count determining module 60 shown in FIG. 2) and an anonymization module (e.g., the anonymization module 70 shown in FIG. 2) included in and/or associated with an edge node (e.g., the first edge node 40-11 shown in FIGS. 1 and 2). Briefly, the method 300 includes determining a first set of attribute hierarchy counts that indicate a number of occurrences of corresponding attributes at a first network node, receiving a second set of attribute hierarchy counts that indicate a number of occurrences of corresponding attributes at a second network node, and determining whether a sum based on the first set of attribute hierarchy counts and the second set of attribute hierarchy counts satisfies an anonymization criterion.

To that end, as represented by block 310, in some implementations the method 300 includes determining a first set of attribute hierarchy counts that indicate a number of occurrences of corresponding attributes that are stored at a first network node and have not been transmitted upstream towards a hub of the distributed hierarchical network. As represented by block 310a, in some implementations, the method 300 includes counting the number of occurrences of each attribute. For example, in some implementations, the method 300 includes accessing a data store (e.g., the data store 50 shown in FIG. 2), and counting the number of occurrences of each attribute that is stored in the data store. As represented by block 310b, in some implementations, the method 300 includes updating the attribute hierarchy counts based on new data. For example, in some implementations, the method 300 includes receiving new sensor data from one or more sensors, identifying occurrences of one or more attributes in the sensor data, and updating the attribute hierarchy counts for the attributes identified in the sensor data.

As represented by block 320, in various implementations, the method 300 includes receiving a second set of attribute hierarchy counts from a second network node (e.g., the second edge node 40-12 shown in FIGS. 1 and 2). In various implementations, the second set of attribute hierarchy counts indicate a number of occurrences of corresponding attributes that are stored at the second network node and have not been transmitted upstream towards the hub. In some implementations, the method 300 includes receiving the second set of attribute hierarchy counts directly from the second network node. Alternatively, in some implementations, the method 300 includes receiving the second set of attribute hierarchy counts via a fog node that serves as a parent node for the first network node and the second network node. In some implementations, the method 300 includes receiving additional sets of attribute hierarchy counts from additional network nodes. For example, in some implementations, the method 300 includes receiving sets of attribute hierarchy counts from all network nodes that are in the same trust network. In other words, in some implementations, the method 300 includes receiving sets of attribute hierarchy counts from all network nodes that are siblings of each other (e.g., all network nodes that have the same fog node as their parent node). As represented by block 320a, in some implementations, the method 300 includes receiving the attributes that correspond with the second set of attribute hierarchy counts. Alternatively, as represented by block 320b, in some implementations, the method 300 includes receiving attribute types of the attributes that correspond with the second set of attribute hierarchy counts.

As represented by block 330, in various implementations, the method 300 includes determining whether a sum based on the first set of attribute hierarchy counts and the second set of attribute hierarchy counts satisfies an anonymization criterion. As represented by block 330a, in some implementations, the method 300 includes determining the sum by adding a first attribute hierarchy count from the first set of attribute hierarchy counts and a second attribute hierarchy count from the second set of attribute hierarchy counts. The first attribute hierarchy count represents a number of occurrences of a particular attribute at the first network node, and the second attribute hierarchy count represents a number of occurrences of that particular attribute at the second network node. Hence, the sum represents a total number of occurrences of that particular attribute at the first network node and the second network node.

In some implementations, the anonymization criterion includes an anonymization threshold. As represented by block 330b, in some implementations, the method 300 includes comparing the sum with the anonymization threshold. In such implementations, if the sum exceeds the anonymization threshold, then the method 300 includes determining that the sum satisfies the anonymization criterion. On the other hand, if the sum is below the threshold, then the method 300 includes determining that the sum does not satisfy the anonymization criterion.

Figure 4:
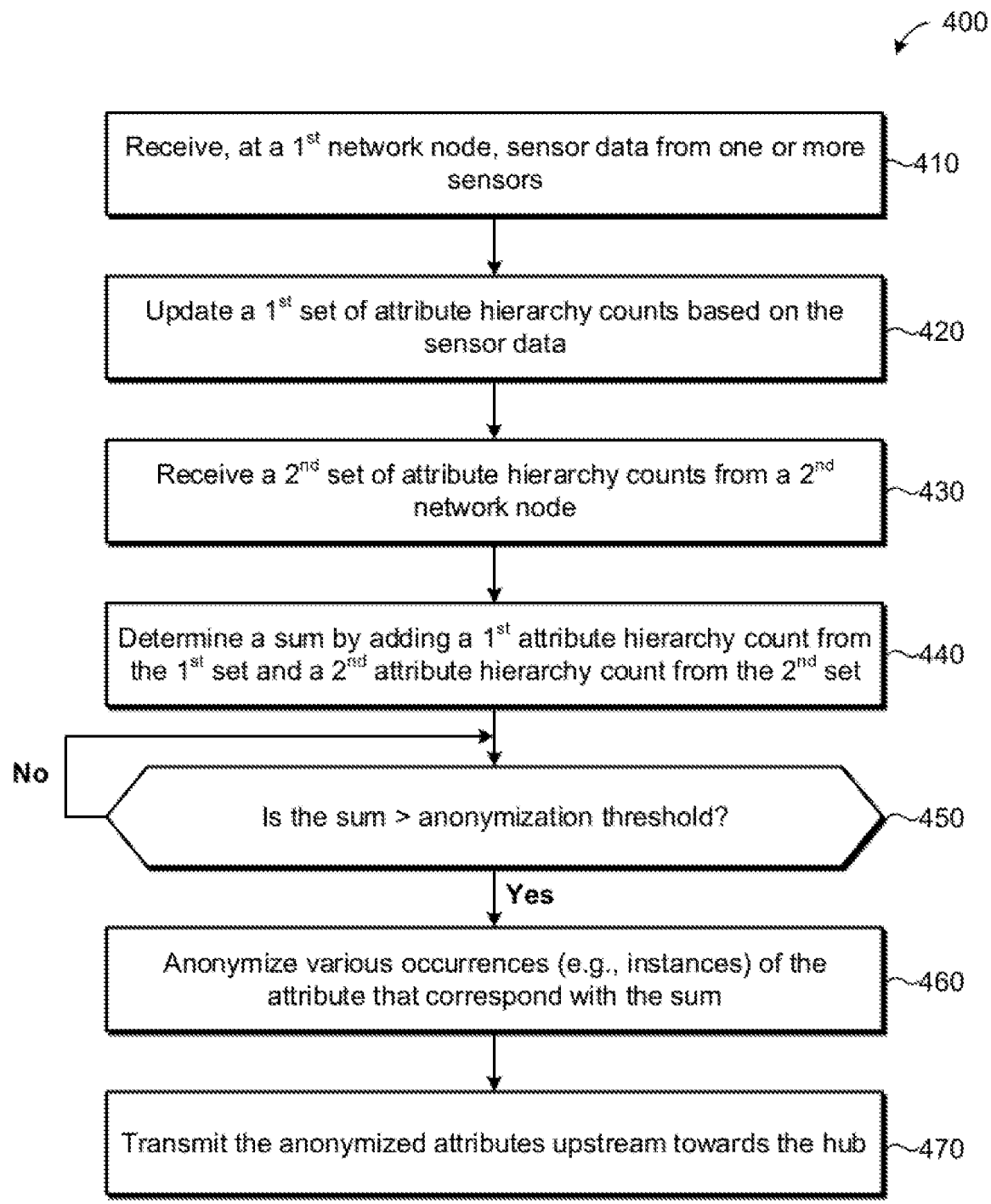
FIG. 4 is a flowchart representation of another method of anonymizing data at an edge node of a distributed hierarchical network in accordance with some implementations.

FIG. 4 is a flowchart representation of a method 400 of anonymizing data at a network node (e.g., the edge nodes 40 and/or the fog nodes 30 shown in FIG. 1) of a distributed hierarchical network according to some implementations. In various implementations, the method 400 is performed by a count determining module (e.g., the count determining module 60 shown in FIG. 2) and an anonymization module (e.g., the anonymization module 70 shown in FIG. 2) included in and/or associated with an edge node (e.g., the edge node 40-11 shown in FIGS. 1 and 2). Briefly, the method 400 includes receiving sensor data, updating a first set of attribute hierarchy counts, receiving a second set of attribute hierarchy counts, determining whether a sum based on the first and second set of attribute hierarchy counts is greater than an anonymization threshold, anonymizing attributes associated with the sum, and transmitting the anonymized attributes.

To that end, as represented by block 410, in some implementations the method 400 includes receiving sensor data (e.g., the sensor data 82 shown in FIGS. 1 and 2) from one or more sensors (e.g., the sensors 80 shown in FIGS. 1 and 2) at a first network node (e.g., the first edge node 40-11 shown in FIGS. 1 and 2). As represented by block 420, in various implementations, the method 400 includes updating a first set of attribute hierarchy counts (e.g., the first set of attribute hierarchy counts 54-1 shown in FIG. 1) based on the sensor data. In some implementations, the method 400 includes parsing the sensor data to identify attributes indicated by the sensor data. In such implementations, the method 400 includes incrementing the attribute hierarchy counts that correspond with the identified attributes to account for the new occurrences of the attributes indicated by the sensor data.

As represented by block 430, in various implementations, the method 400 includes receiving a second set of attribute hierarchy counts (e.g., the second set of attribute hierarchy counts 54-2 shown in FIG. 1) from a second network node (e.g., the second edge node 40-12 shown in FIGS. 1 and 2). In some implementations, the method 400 includes receiving a set of attribute hierarchy counts from each network node that is a sibling of the first network node. As represented by block 440, in various implementations, the method 400 includes determining a sum by adding a first attribute hierarchy count from the first set of attribute hierarchy counts and a second attribute hierarchy count from the second set of attribute hierarchy counts. In some implementations, the method 400 includes determining the sum by adding M attribute hierarchy counts, where M refers to the number of network nodes in the same trust network. In such implementations, the sum represents a total number of occurrences of the correspond attribute at all the network nodes in the trust network.

As represented by block 450, in various implementations, the method 400 includes determining whether the sum satisfies an anonymization criterion. In some implementations, the method 400 includes determining whether the sum is greater than an anonymization threshold. If the sum is greater than the anonymization threshold, then the method 400 proceeds to block 460. Otherwise, the method 400 includes waiting until the sum is greater than the anonymization threshold. As represented by block 460, the method 400 includes anonymizing various instances of the attribute that correspond with the sum. In some implementations, the method 400 includes anonymizing the various instances of the attribute by identifying private information and concealing the private information. In some implementations, the method 400 includes replacing the private information with a character such as an asterisk. As represented by block 470, in various implementations, the method 400 includes transmitting the anonymized attributes (e.g., as the anonymized data 74 shown in FIGS. 1 and 2) upstream towards the hub of the distributed hierarchical network. For example, in some implementations, the method 400 includes transmitting the anonymized attributes to a parent node (e.g., the first fog node 30-1 shown in FIGS. 1 and 2).

Figure 5:
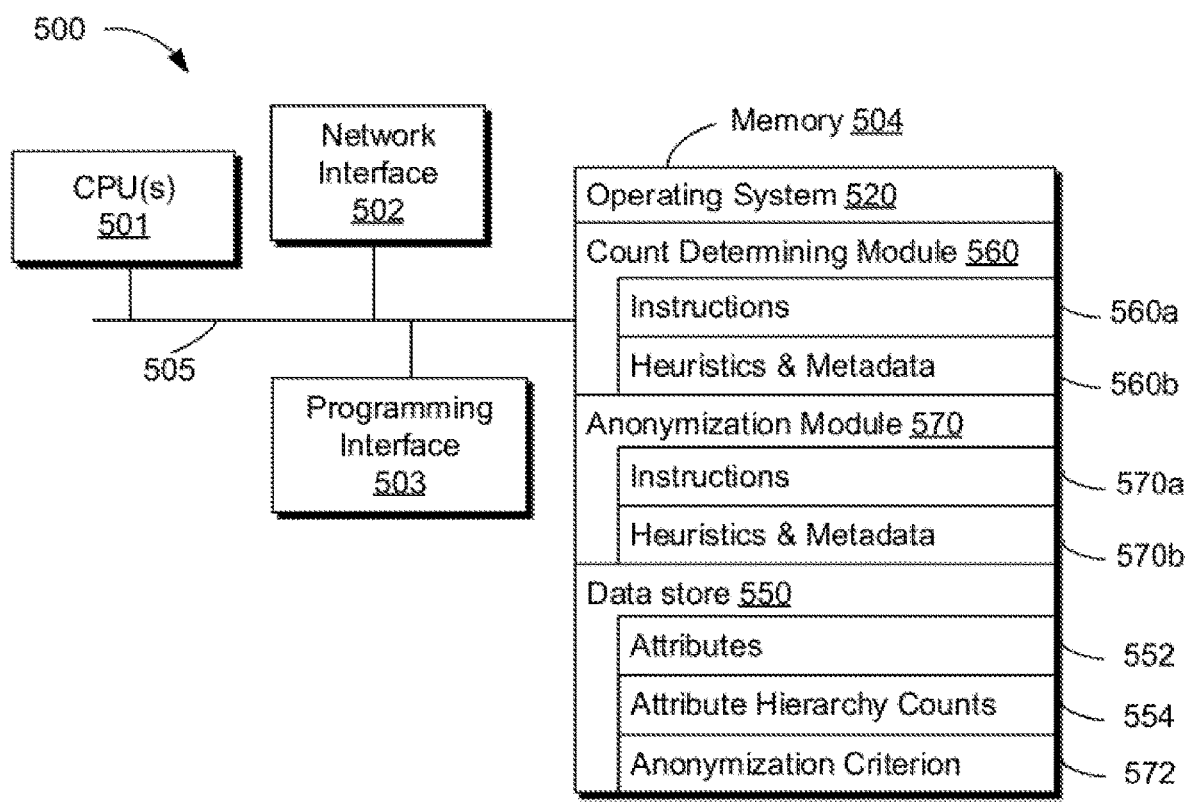
FIG. 5 is a block diagram of a server system enabled with various modules that are provided to anonymize data in a distributed hierarchical network in accordance with some implementations.

FIG. 5 is a block diagram of a server system 500 enabled with various modules of a network node of a distributed hierarchical network (e.g., an edge node 40 and/or a fog node 30 shown in FIGS. 1 and 2) according to some implementations. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the server system 500 includes one or more processing units (CPUs) 501, a network interface 502, a programming interface 503, a memory 504 and one or more communication buses 505 for interconnecting these and various other components.

In some implementations, the memory 504 or the non-transitory computer readable storage medium of the memory 504 stores the following programs, modules and data structures, or a subset thereof including an optional operating system 520, a data store 550, a count determining module 560, and an anonymization module 570. In various implementations, the data store 550, the count determining module 560 and the anonymization module 570 are similar to the data store 50, the count determining module 60 and the anonymization module 70, respectively shown in FIG. 2.

The operating system 520 includes procedures for handling various basic system services and for performing hardware dependent tasks.

In some implementations, the data store 550 stores attributes 552 (e.g., the attributes 52 shown in FIGS. 1 and 2). In some implementations, the data store 550 stores a set of attribute hierarchy counts 554 (e.g., the first set of attribute hierarchy counts 54-1 shown in FIGS. 1 and 2). Each attribute hierarchy count 554 indicates a number of occurrences of a corresponding attribute 552 that is stored in the data store 550 and has not been transmitted upstream towards a hub of a distribute hierarchical network (e.g., the hub 20 of the distribute hierarchical network 10 shown in FIG. 1). In some implementations, the data store 550 stores an anonymization criterion 572 (e.g., the anonymization criterion 72 shown in FIGS. 1 and 2). In some implementations, the anonymization criterion 572 includes an anonymization threshold.

In some implementations, the count determining module 560 is configured to determine the attribute hierarchy counts 554 for the attributes 552. For example, as illustrated in FIGS. 1 and 2, the count determining module 560 counts a number of occurrences of an attribute 552 that is stored in the data store 550 and has not been transmitted upstream towards a hub. In various implementations, the count determining module 560 updates the attribute hierarchy counts 554 based on new sensor data received from one or more sensors. For example, in some implementations, the count determining module 560 parses the sensor data to identify attributes 552 within the sensor data, and updates the attribute hierarchy counts 554 to account for the new occurrences of the attributes 552 within the sensor data. In some implementations, the count determining module 560 performs at least a portion of the method 300 illustrated in FIG. 3. For example, in some implementations, the count determining module 560 performs the operations indicated by block 310 in FIG. 3. In some implementations, the count determining module 560 performs at least a portion of the method 400 illustrated in FIG. 4. For example, in some implementations, the count determining module 560 performs the operations indicated by blocks 410 and 420 in FIG. 4. To that end, in various implementations, the count determining module 560 includes instructions and/or logic 560a, and heuristics and metadata 560b.

In some implementations, the anonymization module 570 is configured to send the attributes 552 as anonymized data (e.g., the anonymized data 74). For example, as illustrated in FIGS. 1 and 2, the anonymization module 570 sends the anonymized data when the anonymization criterion 572 is satisfied. In various implementations, the anonymization module 570 is configured to receive a second set of attribute hierarchy counts (e.g., the second set of attribute hierarchy counts 54-2 shown in FIGS. 1 and 2). In some implementations, the anonymization module 570 determines whether the anonymization criterion 572 is satisfied based on the first set of attribute hierarchy counts 554 and the second set of attribute hierarchy counts. For example, as discussed in relation to FIG. 2, the anonymization module 570 determines whether a sum that is based on the first set of attribute hierarchy counts 554 and the second set of attribute hierarchy counts satisfies the anonymization criterion 572. In some implementations, the anonymization module 570 determines whether the sum exceeds an anonymization threshold indicated by the anonymization criterion 572. In some implementations, the anonymization module 570 performs at least a portion of the method 300 illustrated in FIG. 3. For example, in some implementations, the anonymization module 570 performs the operations indicated by blocks 320 and 330 in FIG. 3. In some implementations, the anonymization module 570 performs at least a portion of the method 400 illustrated in FIG. 4. For example, in some implementations, the anonymization module 570 performs the operations indicated by blocks 430-470 in FIG. 4. To that end, in various implementations, the anonymization module 570 includes instructions and/or logic 570a, and heuristics and metadata 570b.

Figure 6:
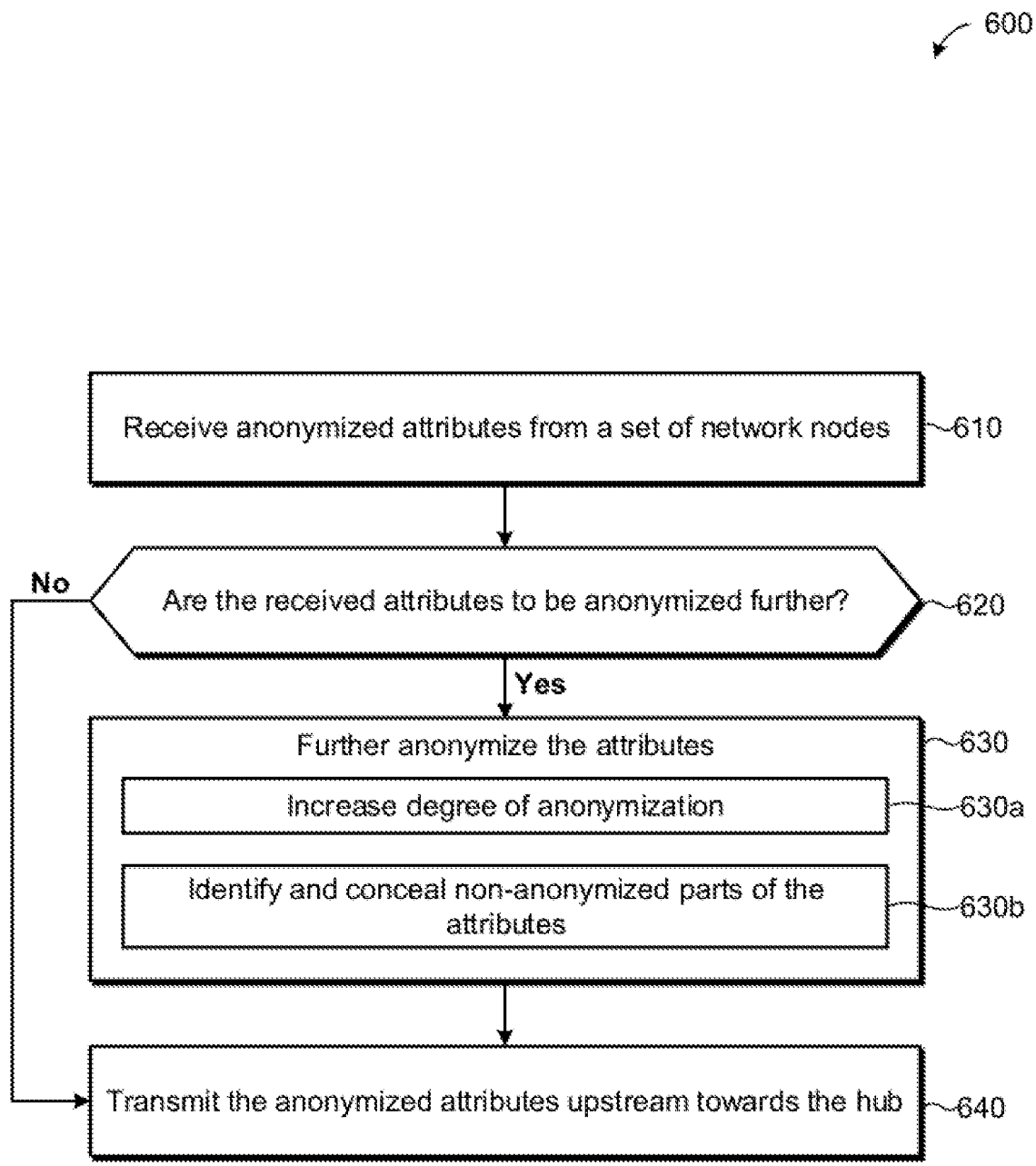
FIG. 6 is a flowchart representation of a method of anonymizing data at a fog node of a distributed hierarchical network in accordance with some implementations.

FIG. 6 is a flowchart representation of a method 600 of anonymizing data at a fog node (e.g., the first fog node 30-1 shown in FIGS. 1 and 2) of a distributed hierarchical network according to some implementations. In various implementations, the method 600 is implemented as a set of computer readable instructions that are executed by one or more processors of the fog node. Briefly, the method 600 includes receiving anonymized attributes, determining whether the received attributes are to be anonymized further, further anonymizing the attributes, and transmitting the anonymized attributes upstream to the hub.

To that end, as represented by block 610, in some implementations the method 600 includes receiving anonymized attributes (e.g., as the anonymized data 74 shown in FIGS. 1 and 2) from a set of network nodes (e.g., the edge nodes 40 shown in FIGS. 1 and 2). As represented by block 620, the method 600 includes determining whether the received attributes are to be anonymized further. In some implementations, the attributes tend to lose their anonymity as they are transmitted upstream towards the hub. In other words, in some implementations, attributes that appear anonymized at the edge nodes tend to appear less anonymized at a fog node. Hence, in some implementations, the method 600 includes determining to further anonymize the attributes. In some implementations, the method 600 includes determining to further anonymize the attributes, if the attributes from different network nodes are so different that the source of the attributes is apparent. Put another way, if the attributes from different network nodes are outside a degree of similarity, then the method 600 proceeds to block 630. If the attributes are not to be further anonymized (e.g., because the attributes from different network nodes are within a degree of similarity), then the method 600 proceeds to block 640.

As represented by block 630, in various implementations, the method 600 includes further anonymizing the attributes. In some implementations, the method 600 includes increasing a degree of anonymization of the attributes (as represented by block 630a). The method 600 includes utilizing a variety of techniques to further anonymize the attributes (e.g., the techniques discussed in relation to Tables 1-5). As represented by block 630b, in some implementations, the method 600 includes identifying non-anonymized parts of the attributes, and concealing the non-anonymized parts of the attributes. In some implementations, the method 600 includes identifying the non-anonymized parts by identifying parts that are dissimilar. As represented by block 640, the method 600 includes transmitting the anonymized attributes (e.g., the further anonymized attributes) upstream towards (e.g., to) the hub.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both node s, but they are not the same node.

The terminology used herein is for the purpose of describing particular embodiments only and is not intended to be limiting of the claims. As used in the description of the embodiments and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
receiving, at a first network node of a group of network nodes in a network, first data from one or more sensors in the network, wherein the first network node includes one or more processors, a non-transitory memory, and one or more network interfaces;
storing, at the first network node, attributes identified in the first data;
determining, by the first network node, a first set of attribute hierarchy counts that indicate a number of occurrences of corresponding attributes that are stored at the first network node and have not been transmitted upstream towards a hub in the network;
receiving, at the first network node, second data from a second network node in the network, the second data comprising a second set of attribute hierarchy counts that indicate a number of occurrences of corresponding attributes that are stored at the second network node and have not been transmitted upstream towards the hub, wherein the attributes that are stored at the second network node are identified by the second network node based on sensor data received at the second network node from one or more second sensors, and the second network node from which the second data derives differs from the one or more sensors from which the first data derives;
determining, by the first network node, whether a sum based on the first set of attribute hierarchy counts and the second set of attribute hierarchy counts satisfies an anonymization criterion, wherein the sum indicates a number of total occurrences for a corresponding attribute that are stored at the first network node and the second network node and that have not been transmitted upstream towards the hub; and
in response to determining that the sum satisfies the anonymization criterion:
anonymizing the occurrences of the attribute that corresponds with the sum.

2. The method of claim 1, wherein determining whether the sum satisfies the anonymization criterion comprises:
   determining whether the sum exceeds an anonymization threshold.
3. The method of claim 1, further comprising:
   transmitting the anonymized occurrences of the attribute upstream towards the hub.
4. The method of claim 3, wherein the anonymizing comprises:
   identifying a portion of the attribute that includes private information; and
   concealing the private information.
5. The method of claim 3, wherein the anonymizing comprises:
   identifying occurrences of the attribute that are within a degree of similarity; and
   generalizing the occurrences by concealing portions that are dissimilar.
6. The method of claim 1, further comprising:
   at a fog node that serves as a parent node for the group of network nodes, the fog node including one or more processors, a non-transitory memory and one or more network interfaces:
   receiving anonymized attributes from the first network node;
   further anonymizing the attributes; and
   transmitting the further anonymized attributes to the hub.
7. The method of claim 6, wherein further anonymizing the attributes comprises:
   increasing a degree of anonymization of the attributes.
8. The method of claim 6, wherein further anonymizing the attributes comprises:
   identifying non-anonymized parts of the attributes; and
   concealing the non-anonymized parts.
9. The method of claim 1, wherein each attribute hierarchy count in the first set and each attribute hierarchy count in the second set is associated with one of a first degree of anonymization and a second degree of anonymization.
10. The method of claim 9, wherein determining whether the sum satisfies the anonymization criterion comprises determining the sum by:
    identifying, from the first set of attribute hierarchy counts, a first attribute hierarchy count that corresponds with a particular attribute and is associated with the first degree of anonymization;
    identifying, from the second set of attribute hierarchy counts, a second attribute hierarchy count that corresponds with the particular attribute and is associated with the first degree of anonymization; and
    adding the first attribute hierarchy count and the second attribute hierarchy count to determine the sum.
11. The method of claim 1, wherein determining the first set of attribute counts comprises:
    counting the number of occurrences of each attribute that is stored at the first network node and that has not been transmitted upstream towards the hub.
12. The method of claim 1, wherein determining the first set of attribute counts comprises:
    updating the first set of attribute hierarchy counts based on the first data.
13. The method of claim 1, wherein receiving the second data indicative of the second set of attribute hierarchy counts from the second network node comprises:
    receiving attribute types of the attributes corresponding with the second set of attribute hierarchy counts; and
    determining the second set of attribute hierarchy counts based on the attribute types.
14. A distributed hierarchical system comprising:
    a count determining module associated with a first network node within a group of network nodes in a network, wherein the count determining module is configured to:
    receive first data from one or more sensors in the network,
    store, at the first network node, attributes identified in the first data, and
    determine a first set of attribute hierarchy counts that indicate a number of occurrences of corresponding attributes that are stored at the first network node and have not been transmitted upstream towards a hub of the distributed hierarchical system; and
    an anonymization module associated with the first network node, wherein the anonymization module is configured to:
    receive, from a second network node, second data comprising a second set of attribute hierarchy counts that indicate a number of occurrences of corresponding attributes that are stored at the second network node and have not been transmitted upstream towards the hub, wherein the attributes that are stored at the second network node are identified by the second network node based on sensor data received at the second network node from one or more second sensors, and the second network node from which the second data derives differs from the one or more sensors from which the first data derives;
    determine whether a sum based on the first set of attribute hierarchy counts and the second set of attribute hierarchy counts satisfies an anonymization criterion, wherein the sum indicates a number of collective occurrences for a corresponding attribute that are stored at the first network node and the second network node and that have not been transmitted upstream towards the hub; and
    in response to determining that the sum satisfies the anonymization criterion:
    anonymizing the occurrences of the attribute that corresponds with the sum.
15. The distributed hierarchical system of claim 14, wherein determining whether the sum satisfies the anonymization criterion comprises:
    determining whether the sum exceeds an anonymization threshold.
16. The distributed hierarchical system of claim 14, wherein the anonymization module is further configured to:
    transmit the anonymized occurrences towards the hub.
17. The distributed hierarchical system of claim 16, wherein the anonymizing comprises:
    identifying a portion of the attribute that includes private information; and concealing the private information.
18. The distributed hierarchical system of claim 6, wherein the anonymizing comprises:
    identifying occurrences of the attribute that are within a degree of similarity; and
    concealing dissimilar portions of the occurrences.
19. The distributed hierarchical system of claim 14, further comprising:
    at a fog node that serves as a parent node for the group of network nodes, the fog node including one or more processors, one or more network interfaces, and a non-transitory memory including computer readable instructions, that when executed by the one or more processors, cause the fog node to:

receive anonymized attributes from the first network node;

further anonymize the attributes; and transmit the further anonymized attributes to the hub.

20. A first network node of a group of network nodes in a network, the first network node comprising:

a network interface;

a processor configured to execute computer readable instructions included on a non-transitory memory; and a non-transitory memory including computer readable instructions, that when executed by the processor, cause the first network node to:

receive first data from one or more sensors in the network;

store, at the first network node, attributes identified in the first data;

determine a first set of attribute hierarchy counts that indicate a number of occurrences of corresponding attributes that are stored at a first network node within a group of network nodes and have not been transmitted upstream towards a hub of a distributed hierarchical network;

receive, from a second network node within the group, second data comprising a second set of attribute hierarchy counts that indicate a number of occurrences of corresponding attributes that are stored at the second network node and have not been transmitted upstream towards the hub, wherein the attributes that are stored at the second network node are identified by the second network node based on sensor data received at the second network node from one or more second sensors, and the second network node from which the second data derives differs from the one or more sensors from which the first data derives;

determine whether a sum based on the first set of attribute hierarchy counts and the second set of attribute hierarchy counts satisfies an anonymization criterion, wherein the sum indicates a number of collective occurrences for a corresponding attribute that are stored at the first network node and the second network node and that have not been transmitted upstream towards the hub; and in response to determining that the sum satisfies the anonymization criterion:

anonymizing the occurrences of the attribute that corresponds with the sum.

* * * * *